(12) United States Patent
Schlemmer

(10) Patent No.: US 11,589,570 B2
(45) Date of Patent: Feb. 28, 2023

(54) SYSTEM FOR SEMI-AUTOMATIC AND/OR AUTOMATIC WEED REMOVAL

(71) Applicant: M-FARMS GMBH, Graefelfing (DE)

(72) Inventor: Christian Schlemmer, Munich (DE)

(73) Assignee: M-FARMS GMBH, Graefelfing (DE)

(*) Notice: Subject to any disclaimer, the term of this patent is extended or adjusted under 35 U.S.C. 154(b) by 50 days.

(21) Appl. No.: 16/759,299

(22) PCT Filed: Oct. 24, 2018

(86) PCT No.: PCT/EP2018/079080
§ 371 (c)(1),
(2) Date: Apr. 24, 2020

(87) PCT Pub. No.: WO2019/081542
PCT Pub. Date: May 2, 2019

(65) Prior Publication Data
US 2021/0176979 A1    Jun. 17, 2021

(30) Foreign Application Priority Data
Oct. 25, 2017  (DE) ..................... 10 2017 124 934.6

(51) Int. Cl.
*A01M 21/04* (2006.01)
*A01M 21/02* (2006.01)

(52) U.S. Cl.
CPC ............ *A01M 21/04* (2013.01); *A01M 21/02* (2013.01)

(58) Field of Classification Search
CPC .... A01M 21/02; A01M 21/04; A01M 21/043; A01M 21/046; A01M 21/00
(Continued)

(56) References Cited

U.S. PATENT DOCUMENTS

| 5,030,086 A * | 7/1991 | Jones ..................... A01M 21/04 |
| | | 431/207 |
| 6,795,568 B1 * | 9/2004 | Christensen .......... A01M 21/04 |
| | | 250/559.29 |

(Continued)

FOREIGN PATENT DOCUMENTS

| DE | 4329343 A1 | 3/1995 |
| DE | 19640641 A1 | 8/1997 |

(Continued)

OTHER PUBLICATIONS

ISA European Patent Office, International Search Report Issued in Application No. PCT/EP2018/079080, dated Apr. 12, 2019, WIPO, 2 pages.

*Primary Examiner* — Kathleen I Alker
(74) *Attorney, Agent, or Firm* — McCoy Russell LLP

(57) ABSTRACT

Provided herein is a system for semi-automatic and/or automatic weed removal a system for automatic detection of weeds including an optical sensor and a central server unit, with communication network, an open-loop and/or closed-loop control device and a weed removal device, wherein the optical sensor, the server unit and the open-loop and/or closed-loop control device are in data connection via the communication network, wherein image data of a weed is generated via the optical sensor and transmitted to the server unit, which analyses the transmitted image data such that the weed can be determined, and wherein, via the server unit, in the case of a clear determination of the weed, weed confirmation data is transmitted to the open-loop and/or closed-loop control device which, in response to the weed confirmation data, controls and/or regulates the weed-removal device so that the weed detected by the optical sensor can be removed.

16 Claims, 8 Drawing Sheets

(58) Field of Classification Search
USPC .................................................. 47/1.3, 1.43
See application file for complete search history.

(56) References Cited

U.S. PATENT DOCUMENTS

| | | | |
|---|---|---|---|
| 9,737,068 B1 * | 8/2017 | Lytle, Jr. ................ | G05D 1/021 |
| 2015/0027041 A1 | 1/2015 | Redden | |
| 2020/0377211 A1 * | 12/2020 | Daddi ................ | A01M 21/046 |

FOREIGN PATENT DOCUMENTS

| | | |
|---|---|---|
| DE | 102013222776 A1 | 5/2015 |
| DE | 102015209879 A1 | 12/2016 |
| EP | 3165089 A1 | 5/2017 |
| WO | 2016191825 A1 | 12/2016 |
| WO | 2017002093 A1 | 1/2017 |

* cited by examiner

SYSTEM FOR SEMI-AUTOMATIC AND/OR AUTOMATIC WEED REMOVAL

CROSS-REFERENCE TO RELATED APPLICATIONS

The present application is a U.S. National Phase of International Patent Application Serial No. PCT/EP2018/079080 entitled "SYSTEM FOR SEMI-AUTOMATIC AND/OR AUTOMATIC WEED REMOVAL," filed on Oct. 24, 2018. International Patent Application Serial No. PCT/EP2018/079080 claims priority to German Patent Application No. 10 2017 124 934.6, filed on Oct. 25, 2017. The entire contents of each of the above-referenced applications are hereby incorporated by reference for all purposes.

TECHNICAL FIELD

The present invention relates to a system for semi-automatic and/or automatic weed removal with at least one system for automatic detection of weeds comprising at least one optical sensor and a central server unit, with at least one communication network and with at least one open-loop control and/or closed-loop control device.

BACKGROUND AND SUMMARY

In the field of agriculture, but also in the field of botany and education in connection with agricultural and forestry professions, but also in the field of biology and botany, it is necessary to be able to reliably detect and, if necessary, remove weed plants.

From DE 43 29 343 A1 a field-suitable and image-analytical method for the automatic detection and control of weed species is already known. In this context, a computer with a camera is set up on site to detect weeds there. However, only a certain number of weeds can be detected and furthermore, the system known from DE 43 29 343 A1 is comparatively large and therefore not easy to handle.

Furthermore, DE 196 40 641 A1 relates to a method and a device for the detection of potential and actual locations of weed as well as weed control or weed prevention on paths and squares in one operation. Thereby, the potentially possible growth locations of weeds are detected or detected with the aid of sensors or the like and the potentially expected or actual growth of weeds is then prevented completely or temporarily by working or by manipulating the weeds or the growth locations.

In addition, DE 10 2013 222 776 A1 shows a device for damaging a weed with a punch for pressurising the weed and a guide device for guiding the punch, the guide device being movably mounted in a guide element.

Due to the missing comparison of the recorded weed image data with weed image data stored in a database or a server unit, in the weed-removal systems of the prior art, inaccurate and faulty determinations of weed plants can occur. Especially, such an inaccurate determination can also lead to the unintentional removal of crops (e.g. cereal) that are not to be removed, thus reducing the crop yield.

It is therefore an object of the present invention to further improve a system for semi-automatic and/or automatic weed removal as mentioned above in a more favourable manner, especially in that weed plants can be determined more precisely and can be removed more efficiently and reliably.

This object is solved according to the present invention by a system for semi-automatic and/or automatic weed removal with the features of claim 1. Accordingly, a system for semi-automatic and/or automatic weed removal is provided with at least one system for automatic detection of weeds comprising at least one optical sensor and a central server unit, with at least one communication network, with at least one open-loop control and/or closed-loop control device and with at least one weed-removal device, wherein the optical sensor, the server unit and the open-loop control and/or closed-loop control device are in data connection by means of the communication network, wherein image data of at least one weed can be generated by means of the optical sensor and transmitted via the communication network to the server unit, which analyses the transmitted image data such that the weed can be determined, and wherein by means of the server unit, in the case of a clear determination of the weed, weed confirmation data can be transmitted via the communication network to the open-loop control and/or closed-loop control device, which, in response to this weed confirmation data, controls and/or regulates the weed-removal device so that the weed detected by the optical sensor can be removed.

The invention is based on the main idea that, by a successful server-based comparison of weed image data acquired by the system from one or more weed plants at the growing site, the weed-removal device is accordingly controlled and/or regulated and consequently the selected weed is removed. On the one hand, this allows the weed removal to be carried out much more efficiently and accurately. On the other hand, another great advantage of server-based comparison of the weed image data is that the determination of the weed at any stage of growth or at any time of the year and the subsequently following weed removal by the weed-removal device can be carried out automatically and in real time. By the system as described above, a further pesticide-free weed removal is envisaged and thus an effective tool for agriculture is provided. Especially, there is a strong motivation to reduce the use of herbicides, such as glyphosate, in any case in the application volume, preferably even to avoid them completely.

The use of a semi-automatic or automatic plant detection system should allow online detection of weed plants and then carry out corresponding (semi-)automatic weed removal by mechanical or thermal means, but not by means of pesticides. In principle, however, the additional use of pesticides is of course still possible in connection with the presented system. The present invention further provides a solution which, on the one hand, enables a (semi-)automatic plant detection and, at the same time, a control of the weed-removal device in real time (i.e. with a minimal time delay after online plant detection). A fast response characteristic and at the same time a safe mechanical removal of the detected weed plant is guaranteed. Especially, this is also possible during operation and also at the corresponding driving speed of the agricultural vehicle.

It may also be provided that the central server unit of the system for automatic detection of plants comprises at least one automatic image processing unit, at least one weed database unit in which weed data are stored and at least one weed image database unit in which image data relating to weed plants are stored. The automatic image processing unit analyses the transmitted image data of the weed by comparison with the weed database unit and the weed image database unit in such a way that the weed can be clearly determined.

Furthermore, it may be provided that the weed-removal device can be positioned within a grid with respect to a reference position, especially a reference position of the optical sensor. The grid allows an even more precise positioning of the weed-removal device in relation to the weeds or weeds detected by the camera, so that they can be removed even more efficiently. Due to the position of the camera, which serves as a reference for the weed-removal device, a calibration of the weed-removal device (e.g. in changing environmental conditions) can also be carried out very easily and quickly. The camera is arranged at a position on the system for semi-automatic and/or automatic weed removal which lies in its direction of movement in front of the spatially variable position of the weed-removal device.

It is further conceivable that the weed-removal device comprises at least one dispensing nozzle of at least one herbicide for chemical weed removal. Since very effective or very specialised chemical weed-removal agents are already available, these can be, depending on the weed species present, removed specifically and thus especially efficiently. Furthermore, several herbicides can be used or combined to remove certain weed species even more efficiently.

In this context, it may further be provided that a herbicide database unit is provided, which is in data communication with the server unit and in which herbicide data is stored. It is also conceivable that link data are stored in the herbicide database unit, by means of which the herbicide data can be linked with the image data of the weeds by a data analysing module. In the agricultural and forestry sector especially, it can be of interest to be able to determine weeds at any growth stage and at any time of the year simply by means of image data and, based on this determination, to be able to obtain a proposal as to which herbicide, especially pesticide, can or should be used to remove the undesired growing plants accordingly. Furthermore, it may be provided that the herbicide data comprise drug group data and/or manufacturer data concerning the manufacturer of a herbicide. By providing drug group data, specifically suitable drug groups may be indicated by the system with regard to herbicides to be used, in order to facilitate the selection of the appropriate herbicide thereby. Especially, it is conceivable that account can be taken according to preferences with regard to a particular manufacturer of a herbicide. This could make it easier for the user of the system to make a pre-selection, so that herbicides directly available to him are proposed and he does not have to select from a confusingly large number of possible options.

In addition, it is conceivable that the weed-removal device comprises at least one mechanical weed-removal device in the form of a gripping device, separating device, pushing device, cutting device, squeezing device and/or pressing device for mechanical weed removal. A purely mechanical weed-removal device is especially environmentally friendly and advantageous, especially in the case of already heavily polluted environmental conditions as a result of over-fertilisation or excessive use of herbicides. Moreover, mechanical weed removal is very efficient and fast, as the weeds can be removed with the roots. In addition, a mechanical weed-removal device can be set up quite simple, light and space-saving, which further increases the efficiency of the system for the semi-automatic and/or automatic weed-removal. It is also conceivable that the mechanical weed-removal device could be a soil cultivation implement or be integrated into it. In this way, the weed can be used as fertiliser plants by being at least partially introduced into the soil by the soil cultivation implement and dying off there.

It is also possible that the weed-removal device comprises at least one heat-generating device and/or optical device (such as a light source or the like), especially a gas burner and/or a laser, for thermal weed removal. Since certain weed species (e.g. grasses) die off, especially in view of excessively high ambient temperatures, this form of weed removal is also very efficient and advantageous. As this is also a purely thermal process, it is also especially advantageous in an already heavily pre-stressed environment (e.g. soil) due to over-fertilisation or excessive use of herbicides. Finally, it does not produce any further deposits in the soil and is therefore especially environmentally friendly. In addition, the ash formed by thermal removal can be used to fertilise crop plants intended not to be removed. By means of a laser, for example, weed removal can be performed (optically-) thermally. The energy applied by the laser allows weed to be removed precisely and quickly. Especially, it is conceivable to use a laser, by means of which the weed plant is at least partially vaporized or (optically-) thermally damaged in such a way that it dies.

Furthermore, it may be provided that the weed-removal device comprises at least one compressed air outflow nozzle for pneumatic weed removal. This type of pneumatic weed removal can be used especially efficiently and advantageously in very loose, i.e. non-compressed, soils, in which the roots of the weeds have little support. As pneumatic weed removal only works with pressurised ambient air, it is also possible to achieve a very environmentally friendly weed removal.

It is also conceivable that the weed-removal device comprises at least one fluid outflow nozzle of at least one pressurised fluid, especially water, for hydraulic weed removal. Like pneumatic weed removal, hydraulic weed removal can also be used especially efficiently and advantageously in very loose, i.e. non-compressed, soils, in which the roots of the weeds have little support. As the hydraulic weed removal only works with pressurized water, a very environmentally friendly weed removal thus is possible. Another advantageous effect of hydraulic weed removal with water is an additional and efficient irrigation of agricultural used crop plants, because it is close to the ground.

Furthermore, it is conceivable that the weed-removal device comprises at least one electric heat-generating device for electro-thermal weed removal. By an appropriate design of the electrical heat generating device the amount of heat required for the removal of the weed can be introduced into the respective weed in a very targeted and thus especially efficient manner. In contrast to a gas burner, whose heat generation is based on a $CO_2$-emitting combustion process, electro-thermal weed removal is therefore additionally more environmentally friendly or sustainably.

Furthermore, it is possible that the optical sensor is a digital camera, especially a CCD camera. The generation of the weed image data by means of the digital camera with a CCD chip is especially advantageous for the digital image processing by the automatic image processing unit and the subsequent comparison together with the weed database unit and the weed image database unit in terms of fast processing time and efficiency. The digital camera can also be used in a wide range of optical applications, as it can be used for visible wavelengths as well as for infrared, UV and X-ray ranges. This allows the spectrum for optical applications to be extended especially advantageously (approx. 0.1 pm wavelength to approx. 1100 nm wavelength). Further advantages of the digital CCD camera are its broad spectral sensitivity and its high dynamic range (ability to simultaneously detect very weak and very bright areas of a weed).

In addition, it may be envisaged that the system for semi-automatic and/or automatic weed removal is integrated in a vehicle, especially an agricultural vehicle. It is also conceivable that the system for semi-automatic and/or automatic weed removal can be integrated into at least one attachment in addition to or as an alternative to the agricultural vehicle. In the agricultural environment, the use of the semi-automatic and/or automatic weed-removal system is especially advantageous because it can be integrated quite easily into existing vehicles and/or attachments without disproportionate high effort. This allows users to increase their harvest yield efficiently and without disproportionately high additional expense, which further improves the competitive situation of the user.

It is also conceivable that the system for semi-automatic and/or automatic weed removal is integrated into a human-portable and human-actuable weed-removal device. The use in a human-portable and human-actuable device for weed removal is especially advantageous because in this way the supporting determination of weeds can be carried out by the system in addition to the human determination. In this way, the proportion of correctly determined weeds can be further increased and, especially, the undesirable wrong determination of, for example, crop plants as weeds can be further reduced, resulting in additional protection of the plants not to be removed.

It is also conceivable that the image data and weed confirmation data additionally comprise location data, e.g. GPS data. The additional location data in the form of GPS data is especially advantageous for highly automated agricultural vehicles, because, if the same position is reached and passed several times, the temporal growth development of a certain weed plant or the effect of different weed removal methods can be assessed much better, more accurately and in relation to the location. Thus, important statistical data can be collected, which can play a decisive role for the future improvement of the efficiency of the system for semi-automatic and/or automatic weed removal.

BRIEF DESCRIPTION OF THE FIGURES

Further details and advantages of the present invention shall now be explained in more detail by the embodiments in connection with the drawings.

It is shown in

FIG. 1 shows a schematic representation of a first embodiment of a semi-automatic or automatic weed-removal system 10 according to the invention.

DETAILED DESCRIPTION

Figure 1:
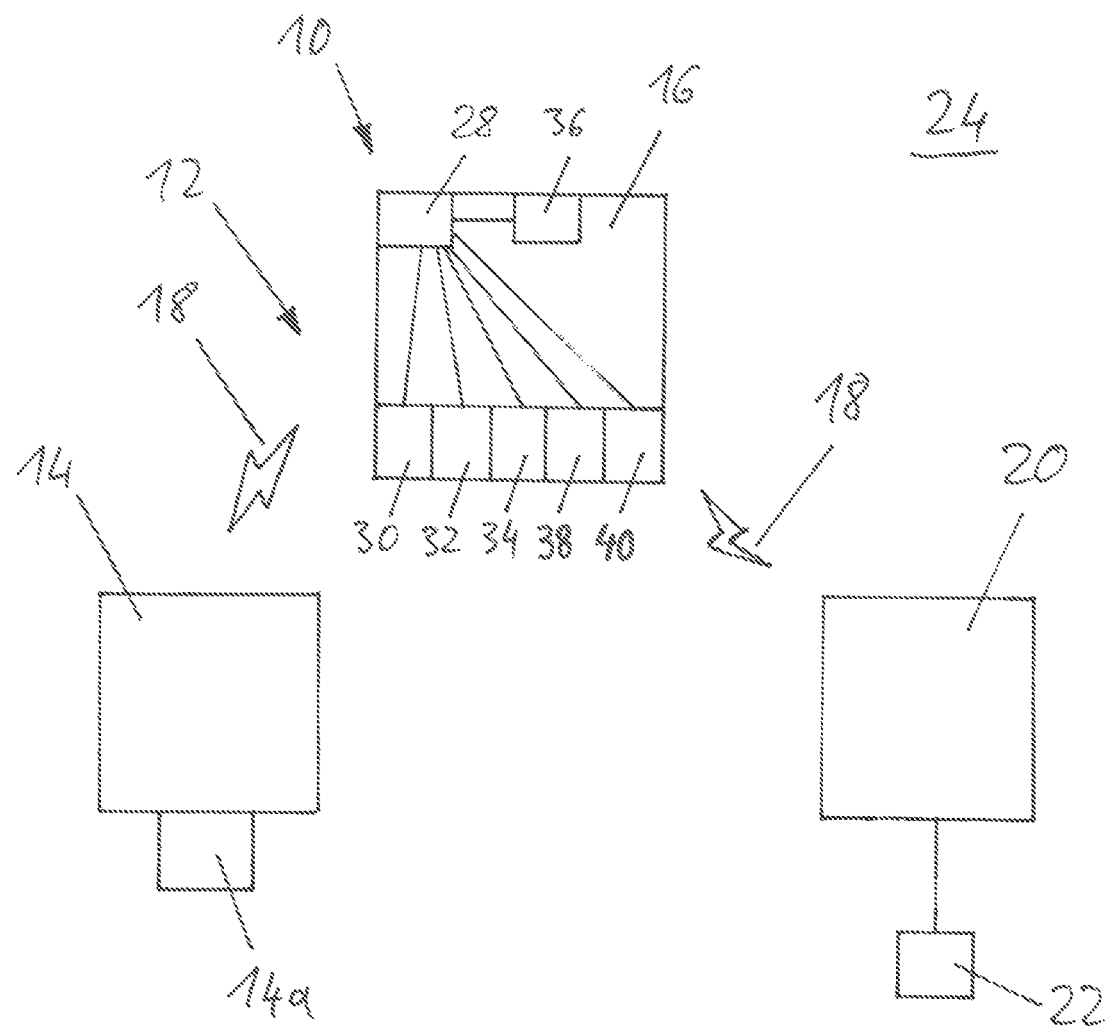
FIG. 1 a schematic representation of a first embodiment of a semi-automatic or automatic weed-removal system according to the invention.

The system 10 for semi-automatic or automatic weed removal shown in FIG. 1 comprises a system 12 for automatic weed detection.

The system 12 for automatic weed detection further comprises an optical sensor 14 and a central server unit 16.

The optical sensor 14 is a digital camera 14a, which is formed as a digital CCD camera.

Furthermore, the system 10 for semi-automatic or automatic weed removal comprises a communication network 18 (especially the Internet), an open-loop control or closed-loop control device 20, and a weed-removal device 22.

The weed-removal device 22 can further be positioned within a grid with regard to a reference position of the optical sensor 14.

The weed-removal device 22 can be formed as a chemical, mechanical, thermal, pneumatic, hydraulic or electro-thermal weed-removal device 22, 22a, 22b, 22c, 22d, 22e, 22f in accordance with the weed-removal devices 22a, 22b, 22c, 22d, 22e, 22f as shown in FIGS. 3 to 8. In addition, the optical sensor 14, the server unit 16 and the open-loop control or closed-loop control device 20 are in data connection via the communication network 18.

In addition, the optical sensor 14 or the digital CCD camera 14a generates image data of a weed and transmits it via the communication network 18 to the server unit 16.

The image data also contain GPS data.

The server unit 16 further comprises an automatic image processing unit 28, a weed database unit 30, a weed image database unit 32 and a herbicide database 34.

The server unit 16 further comprises, in addition to a data analysis module 36, a plant disease database unit 38 and a plant pest database unit 40.

All units 28, 30, 32, 34, 36, 38, 40 of the central server unit 16 are also in data connection with each other according to FIG. 1.

The system 10 for semi-automatic or automatic weed removal is integrated into an agricultural vehicle 24 as shown in FIG. 1.

The agricultural vehicle 24 can, for example, be a tractor or a tractor combination.

The tractor combination consists e.g. of the tractor and an attached or fixed attachment (not shown in FIG. 1 in detail).

The function of the semi-automatic or automatic system 10 for weed removal can now be described as follows:

First, image data of one or several weeds are generated by means of the optical sensor 14 or the digital CCD camera 14a and transmitted via the communication network 18 to the server unit 16.

The server unit 16 then analyses the transmitted image data of the weeds in such a way that the respective weed can be determined.

Within the central server unit 16 an analysis of the transmitted image data is therefore carried out by means of the automatic image processing unit 28.

The automatic image detection, which is carried out by means of the automatic image processing unit 28, can orient itself by means of reference points or reference pattern structures of the image information contained in the transmitted images regarding the recorded weed plants.

This analysis serves to match the information on a weed plant contained in the image data with the image data contained in the weed image database unit 32 and to automatically determine the corresponding weed plant in connection with the weed database unit 30.

By means of the data analysis module 36 it is possible, after detection of the weed plant, to automatically provide a suggestion on the basis of the herbicide data contained in the herbicide database unit 34, which suitable herbicide can be used against the previously determined or detected weed.

It is also conceivable, for example, that image data of weed plants, once correctly detected, can also be used, for example that, on the basis of the images transmitted to the central server unit 16, this image information can also be stored in the weed database unit 30.

It is also conceivable that this can only take place after a corresponding confirmation has taken place by a qualified user.

Such a user can be a so-called power user or an employee of the operator who comprises the corresponding knowledge about the weed plants.

On the basis of the transmitted image data of the weed it can be determined additionally by the data analysis module 36 and the plant disease database unit 38 whether and which diseases of the weed are present.

Here, especially on the basis of colour and/or structure or the corresponding changes, it can be detected whether or which weed disease is present. This process is also carried out automatically.

On the basis of the transmitted image data of the weed, which are compared, it is also possible to detect at the same time to what extent plant pests are present.

For this purpose the data stored in the plant pest data base unit 40 is accessed by the data analysis module 36, which is then linked accordingly with the other existing data.

For example, the data contained in the herbicide database unit 34 can be used for herbicides or pesticides accordingly in order to automatically find here a suitable suggestion as well as to which pesticide can be used.

The analysis is based on whether, for example, aphids, beetles, fleas, insects or corresponding feeding patterns can be detected on the transmitted images.

In connection with occurring weed diseases or its infestation by plant pests, it may be possible to link the corresponding location data or GPS data with information concerning weed diseases or the occurrence of plant pests.

From the information concerning the location and occurrence of weed diseases and pests, the System 10, 100 can detect where they occur and transmit this information.

Thus, the system 10 further can automatically decide whether weed removal by the weed-removal device 22 is still necessary due to disease or pest infestation, or whether the weed would die anyway due to this natural weakening and thus would make their removal unnecessary.

In this way, the use of plant protection products can also be significantly reduced or the service life of the weed-removal system 22 can be significantly increased.

However, if the weed clearly determined by the central server unit 16 is healthy or do not show any pest infestation and should therefore be removed by the weed-removal device 22, the server unit 16 proceeds automatically as follows:

In the case of an unambiguous determination of the weed, weed confirmation data are transmitted by means of the server unit 16 via the communication network 18 to the open-loop control or closed-loop control device 20.

The weed confirmation data can also include GPS data, which makes the open-loop control or closed-loop control of the weed-removal device 22 more precise.

The open-loop control or closed-loop control device 20 then controls or regulates the weed-removal device 22 in response to this weed confirmation data so that the weed detected by the optical sensor 14 can be removed.

This case occurs especially if the system 10 is a system 10 automatic weed removal, because the weed-removal device 22 can then automatically remove the weed determined accordingly.

Figure 2:
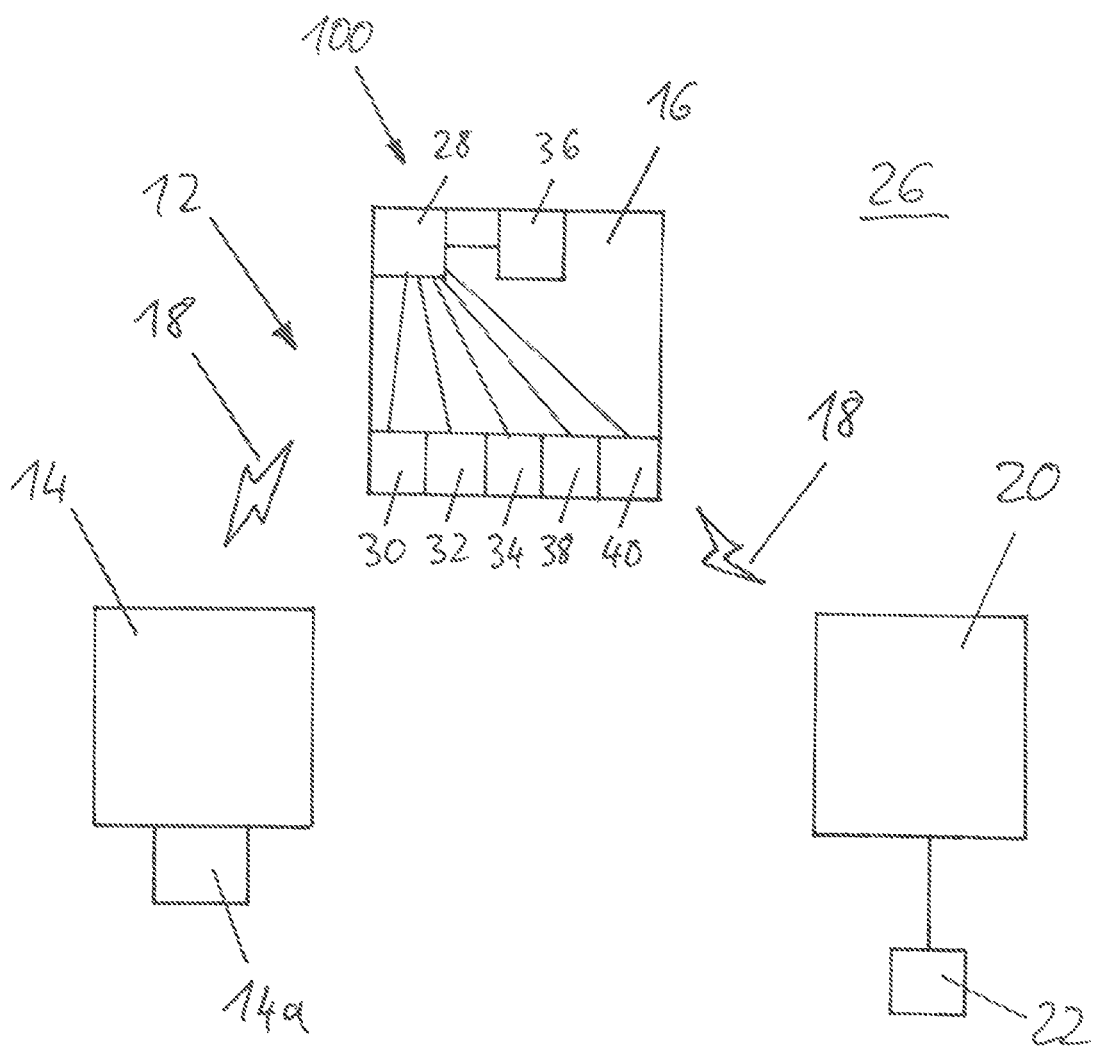
FIG. 2 a schematic representation of a second embodiment of a semi-automatic weed-removal system according to the invention.

FIG. 2 shows a schematic representation of a second embodiment of a semi-automatic system 100 for weed removal according to the invention.

The second embodiment of this inventive system 100 as shown in FIG. 2 comprises essentially the same structural and functional features as the first embodiment of the semi-automatic or automatic weed-removal system 10 as shown in FIG. 1.

Only the following structural differences in features shall be shown:

System 100 is a semi-automatic weed-removal system 100 and is integrated into a human-portable and human-actuable weed-removal device 26.

Such a device 26 can be, for example, a brush cutter, a brush saw, a gas burner or a pressure sprayer for herbicides.

In addition, the following functional differences in features shall be shown in relation to the first embodiment of the semi-automatic or automatic weed-removal system 10 as shown in FIG. 1:

In the case of integration of this system 100 in the human-portable and human-actuable weed-removal device 26, the open-loop control or closed-loop control device 20 controls or regulates, in response to the weed confirmation data, e.g. a graphic display device on which the weed confirmation data is visible to a user.

As a result of this supporting visual weed confirmation data the user can then remove the corresponding weeds automatically determined by the server unit 16 by means of the weed-removal device 22.

In addition, it is conceivable that through the user's approval of the weed confirmation data (e.g. by actuating an electrical switch) a corresponding approval signal is transmitted to the open-loop control or closed-loop control device 20, whereupon the weed-removal device 22 carries out the weed removal automatically.

Figure 3:
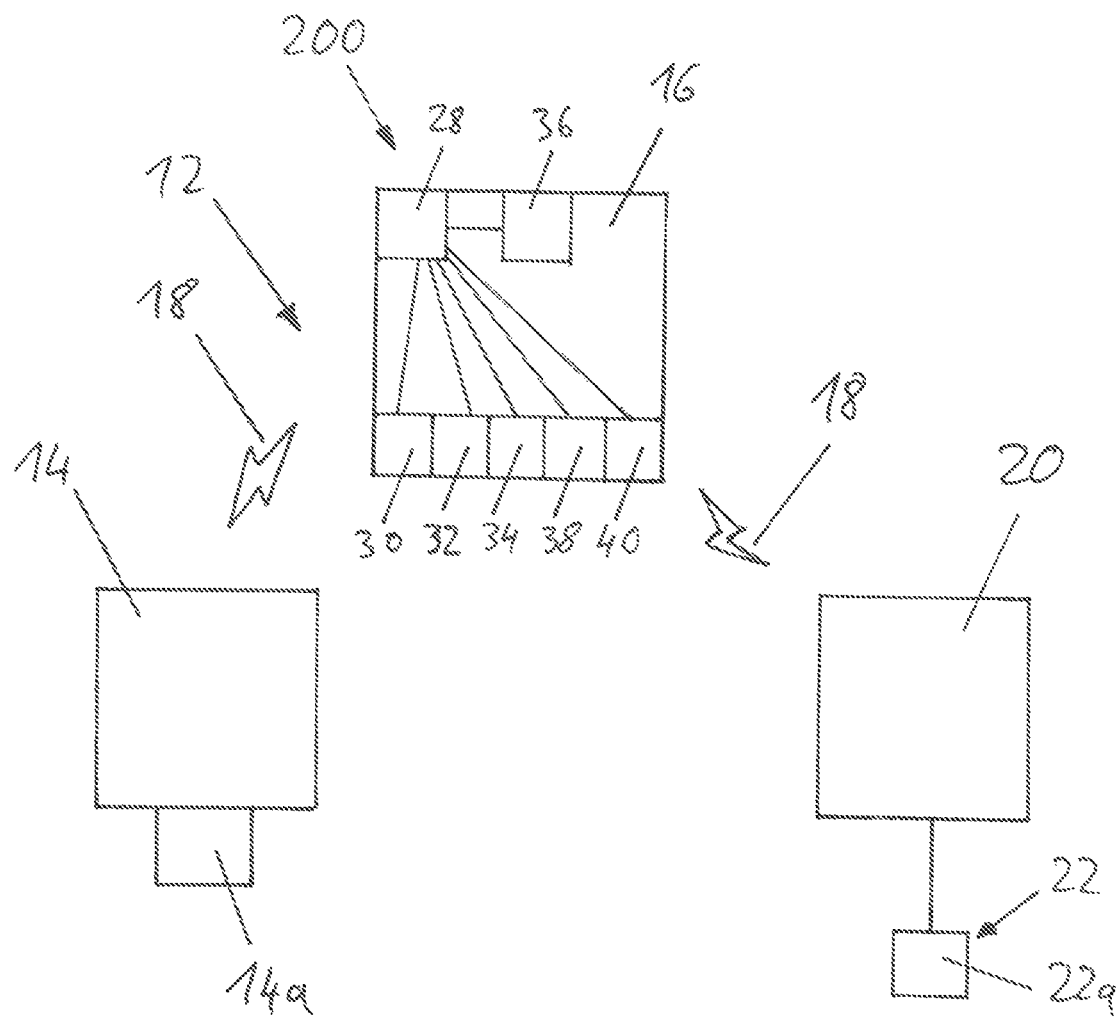
FIG. 3 a schematic representation of a third embodiment of a semi-automatic or automatic weed-removal system according to the invention.

FIG. 3 shows a schematic representation of a third embodiment of a semi-automatic or automatic system 200 for weed removal according to the invention.

The third embodiment of this inventive system 200 shown in FIG. 3 comprises essentially the same structural and functional features as the first or second embodiment of the semi-automatic or automatic weed-removal system 10, 100 as shown in FIG. 1 or FIG. 2.

Only the following structural and functional differences in features should be shown:

The weed-removal device 22 comprises, as shown in FIG. 3, an outflow nozzle 22a of a herbicide for chemical weed removal.

The necessary components such as pump, tanks, valves and lines for the dispensing of the pressurized herbicide via the outflow nozzle 22a are also integrated in the System 200.

Figure 4:
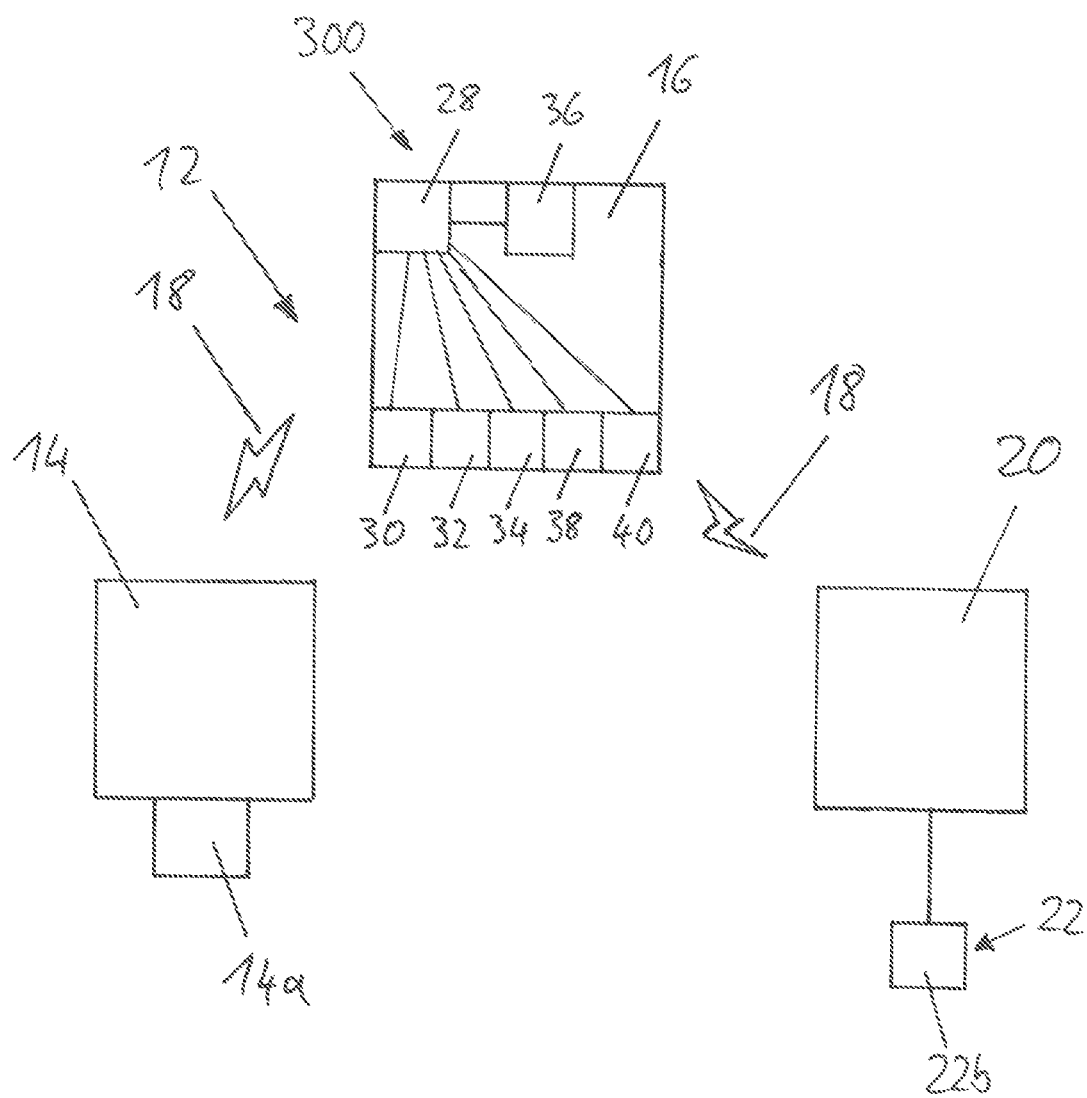
FIG. 4 a schematic representation of a fourth embodiment of a semi-automatic or automatic weed-removal system according to the invention.

FIG. 4 shows a schematic representation of a fourth embodiment of an inventive semi-automatic or automatic System 300 for weed removal.

The fourth embodiment of this inventive system 300 shown in FIG. 4 comprises essentially the same structural and functional features as the first or second embodiment of the semi-automatic or automatic weed-removal system 10, 100 as shown in FIG. 1 or FIG. 2.

Only the following structural and functional differences in the features should to be shown:

The weed-removal device 22 comprises a mechanical weed-removal device 22b.

The mechanical weed-removal device 22b is designed in the form of a gripping device, separating device, pushing device, cutting device, squeezing device or pressing device for mechanical weed removal.

Figure 5:
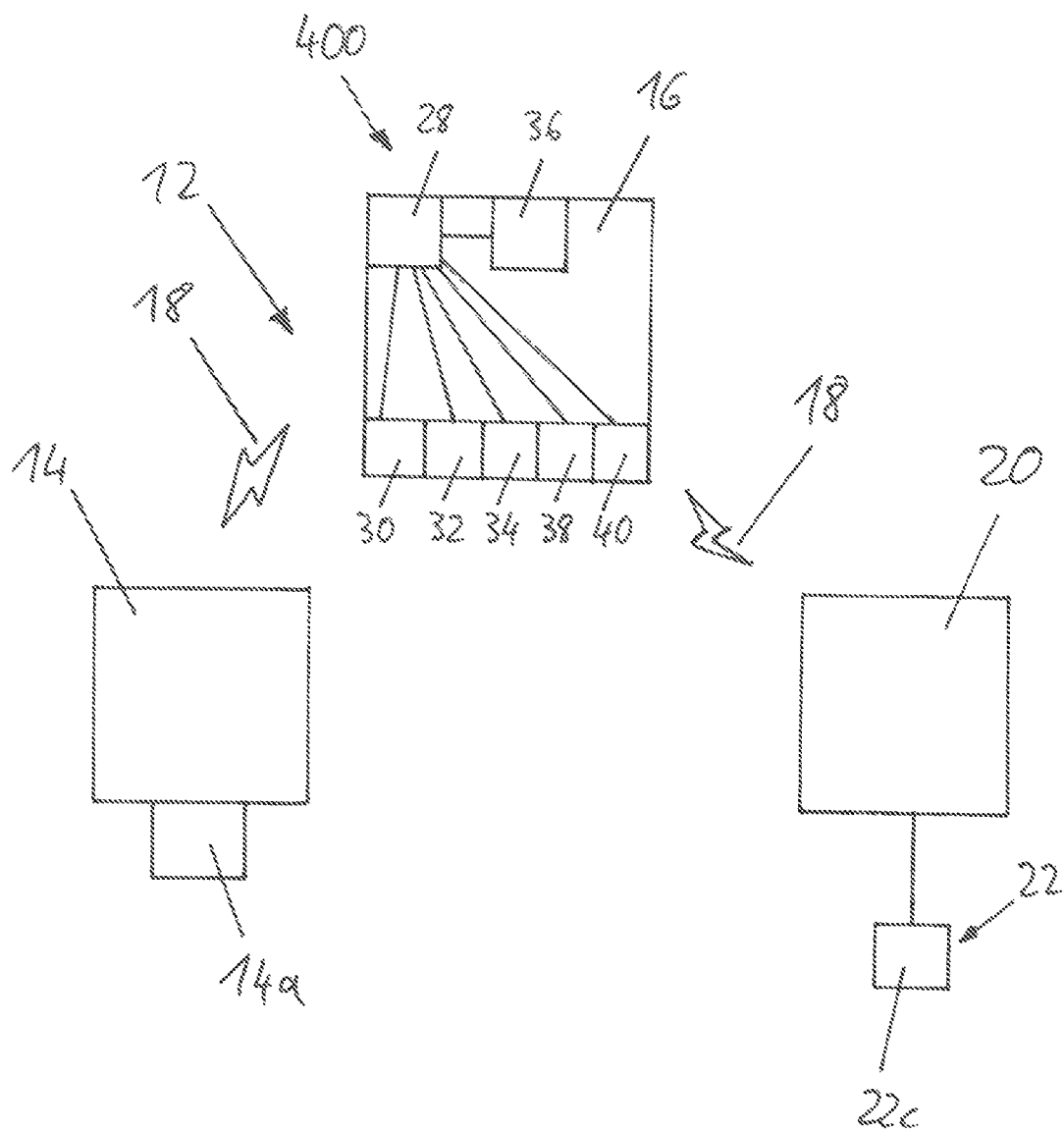
FIG. 5 a schematic representation of a fifth embodiment of a semi-automatic or automatic weed-removal system according to the invention.

FIG. 5 shows a schematic representation of a fifth embodiment of an inventive semi-automatic or automatic system 400 for weed removal.

The fifth embodiment of this inventive system 400 shown in FIG. 5 comprises essentially the same structural and functional features as the first or second embodiment of the semi-automatic or automatic weed-removal system 10, 100 as shown in FIG. 1 or FIG. 2.

Only the following structural and functional differences in features should be shown:

The weed-removal device 22 comprises a gas burner 22c for thermal weed removal.

In this context it is also conceivable to use (at least) one laser instead of a gas burner. The laser can also be added to other methods.

The necessary components such as gas bottle, valves and lines for dispensing of the pressurized gas by means of the gas burner 22c are also integrated into the System 400.

Figure 6:
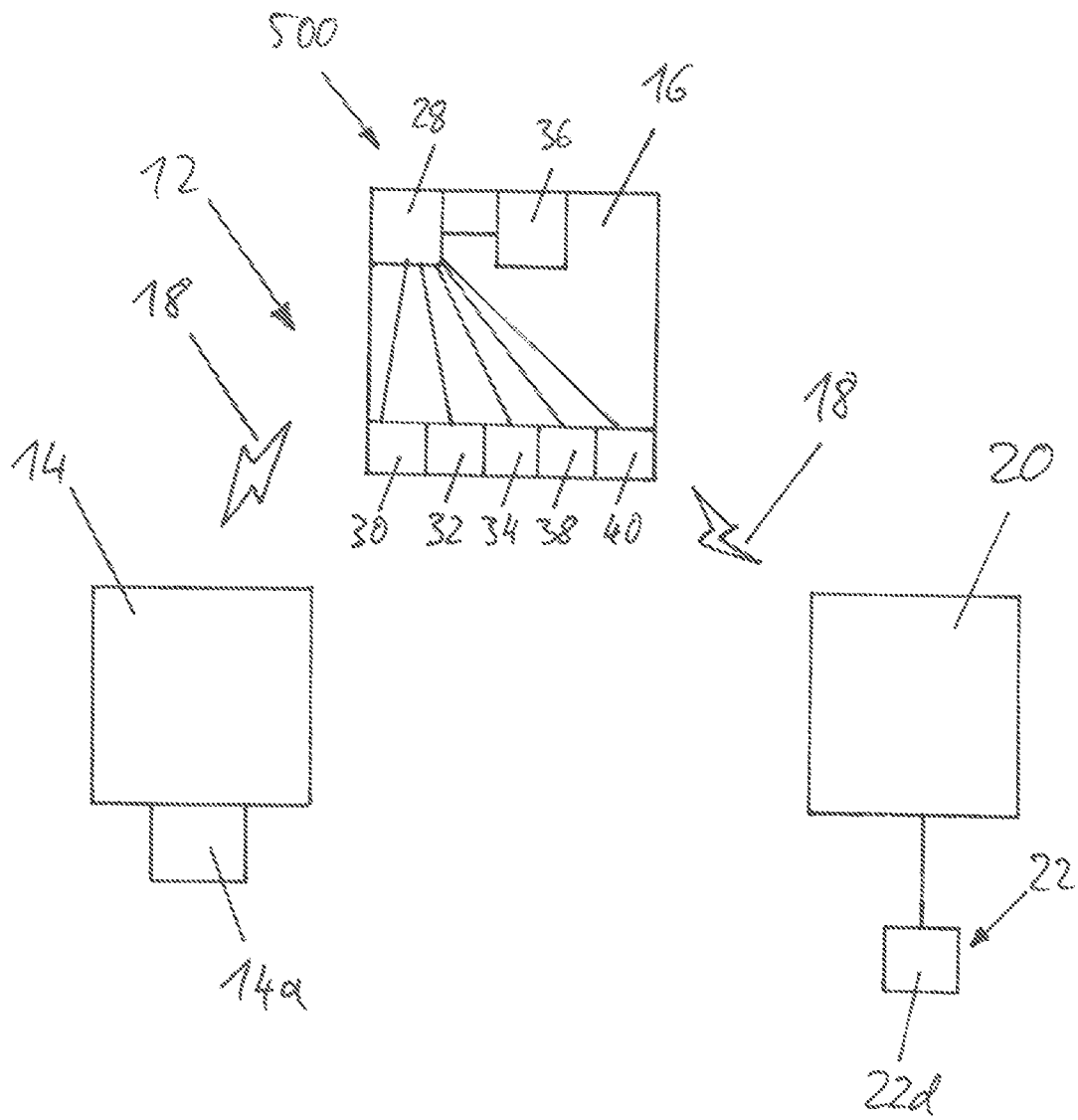
FIG. 6 a schematic representation of a sixth embodiment of a semi-automatic or automatic weed-removal system according to the invention.

FIG. 6 shows a schematic representation of a sixth embodiment of an inventive semi-automatic or automatic system 500 for weed removal.

The sixth embodiment of this inventive system 500 shown in FIG. 6 comprises essentially the same structural and functional features as the first or second embodiment of the semi-automatic or automatic weed-removal system 10, 100 as shown in FIG. 1 or FIG. 2.

Only the following structural and functional differences in features should be shown:

The weed-removal device 22 comprises a compressed air outflow nozzle 22d for pneumatic weed removal.

The necessary components such as the air compressor, air reservoir, valves and lines for dispensing of the compressed air via the compressed air outflow nozzle 22d are also integrated in the System 500.

Figure 7:
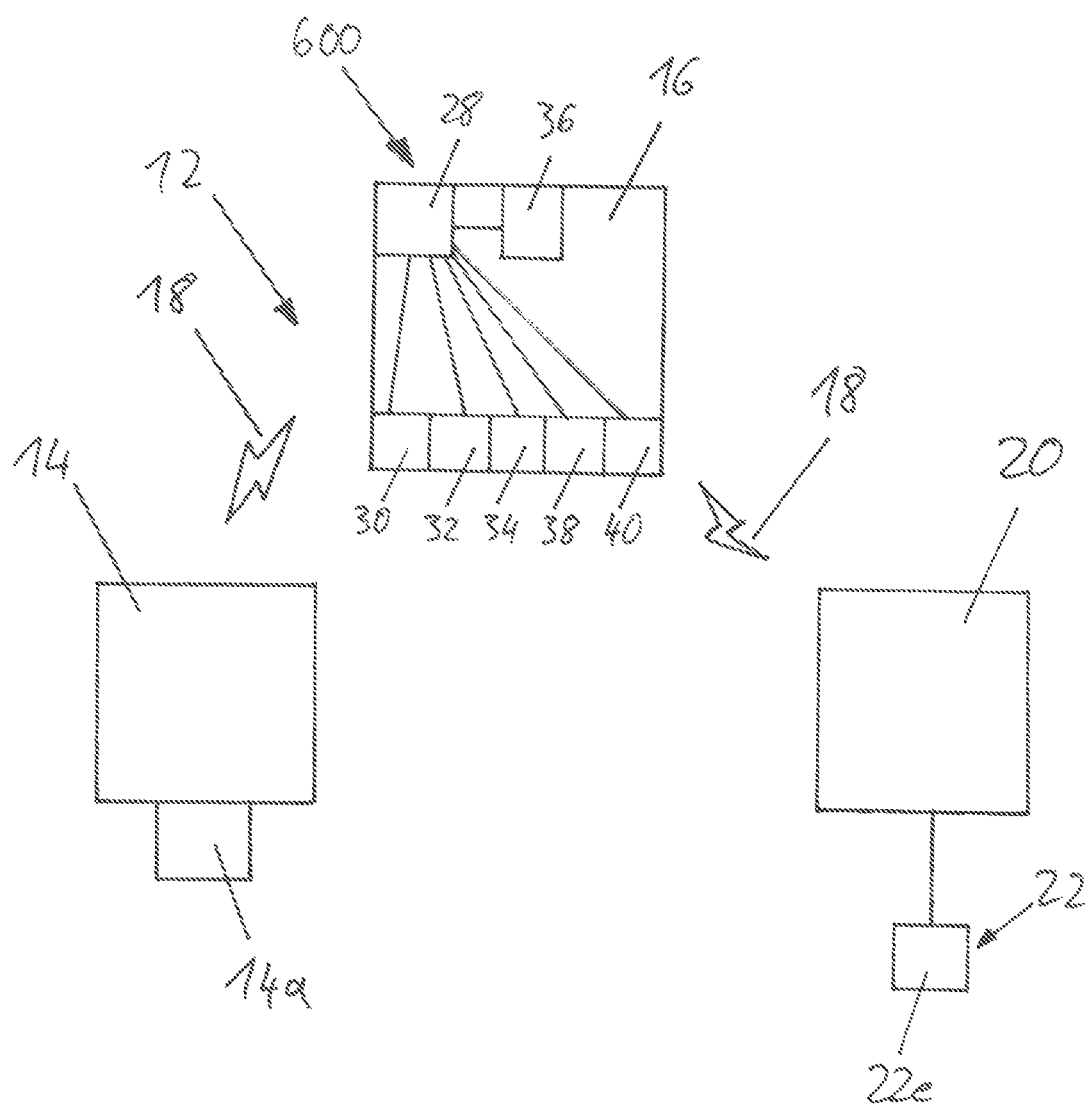
FIG. 7 a schematic representation of a seventh embodiment of a semi-automatic or automatic weed-removal system according to the invention.

FIG. 7 shows a schematic representation of a seventh embodiment of an inventive semi-automatic or automatic System 600 for weed removal.

The seventh embodiment of this inventive system 600 shown in FIG. 7 comprises essentially the same structural and functional features as the first or second embodiment of the semi-automatic or automatic weed-removal system 10, 100 as shown in FIG. 1 or FIG. 2.

Only the following structural and functional differences in features should be shown:

The weed-removal device 22 comprises a fluid outflow nozzle 22e for pressurized water for hydraulic weed removal.

The necessary components such as water pump, water tank, valves and lines for dispensing of the pressurized water via the fluid outflow nozzle 22e are also integrated in the System 600.

Figure 8:
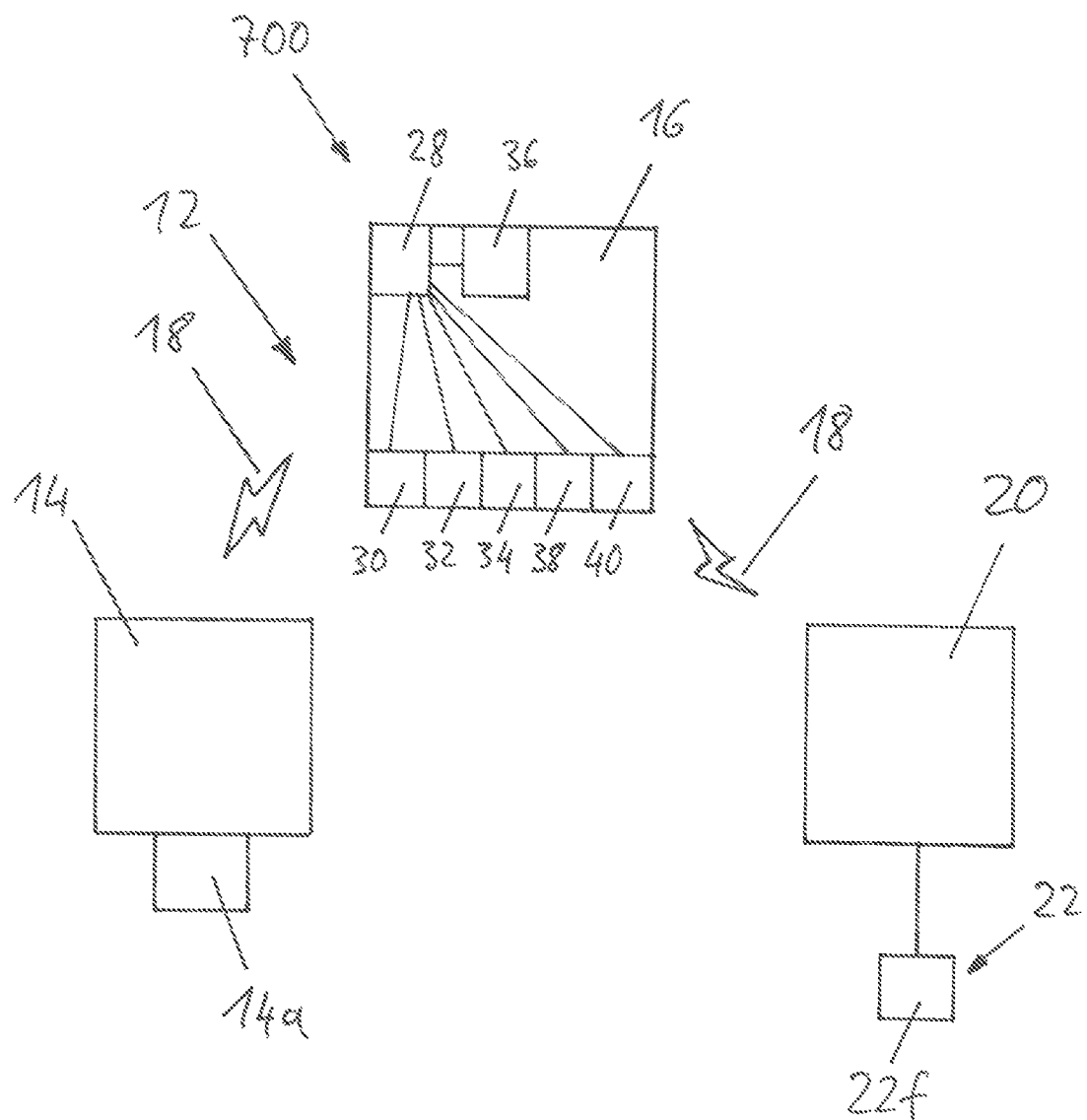
FIG. 8 a schematic representation of an eighth embodiment of a semi-automatic or automatic weed-removal system according to the invention.

FIG. 8 shows a schematic representation of an eighth embodiment of an inventive semi-automatic or automatic system 700 for weed removal.

The eighth embodiment of this inventive system 700 shown in FIG. 8 comprises essentially the same structural and functional features as the first or second embodiment of the semi-automatic or automatic weed-removal system 10, 100 as shown in FIG. 1 or FIG. 2.

Only the following structural and functional differences in features should be shown:

The weed-removal device 22 further comprises an electric heat generating device 22f for electro-thermal weed removal.

The necessary electrical components such as power supply, transformer, switching and control equipment and electrical lines for heating the electrical heat generating device 22f are also integrated into the system 700.

REFERENCE SIGNS

10 system for semi-automatic or automatic weed removal
12 system for automatic weed detection
14 optical sensor
14a digital CCD camera
16 central server unit
18 communication network
20 open-loop control or closed-loop control device
22 weed-removal device
22a herbicide dispensing nozzle
22b mechanical weed-removal device
22c heat generating device
22d compressed air outflow nozzle
22e fluid outflow nozzle
22f electrical heat generating device
24 agricultural vehicle
26 human-portable and human-actuable weed-removal device
28 image processing unit
30 weed database unit
32 weed image database unit
34 herbicide database
36 data analysis module
38 plant disease database unit
40 plant pest database unit
100 system for semi-automatic or automatic weed removal
200 system for semi-automatic or automatic weed removal
300 system for semi-automatic or automatic weed removal
400 system for semi-automatic or automatic weed removal
500 system for semi-automatic or automatic weed removal
600 system for semi-automatic or automatic weed removal
700 system for semi-automatic or automatic weed removal

The invention claimed is:

1. A system for semi-automatic and/or automatic weed removal comprising: at least one system for automatic detection of weeds comprising at least one optical sensor and a central server unit, at least one communication network, at least one open-loop control and/or closed-loop control device and at least one weed-removal device, wherein the at least one optical sensor, the central server unit and the at least one open-loop control and/or closed-loop control device are in data connection via the at least one communication network, wherein image data of at least one weed is generated via the at least one optical sensor and transmitted via the at least one communication network to the central server unit, which analyses the transmitted image data such that the at least one weed can be determined, and wherein via the central server unit, in the case of a clear determination of the at least one weed, weed confirmation data is transmitted via the at least one communication network to the at least one open-loop control and/or closed-loop control device, which, in response to the weed confirmation data, controls and/or regulates the at least one weed-removal device so that the at least one weed detected by the at least one optical sensor can be removed, wherein the central server unit comprises a data analysis module and a plant disease database unit, by which it can be determined on the basis of the transmitted image data of the at least one weed, whether and which diseases of the at least one weed are present, such that the system can automatically decide for the at least one weed whether removing the at least one weed by the at least one weed-removal device is still necessary or whether removing the at least one weed is unnecessary, the removal of the at least one weed by the at least one weed-removal device being unnecessary responsive to determining the at least one weed is going to die from natural weakening due to disease of the at least one weed, and wherein, responsive to determining the at least one weed is healthy, removing the at least one weed that is healthy by the at least one weed-removal device.

2. The system for semi-automatic and/or automatic weed removal according to claim 1, wherein the at least one weed-removal device comprises at least one dispensing nozzle of at least one herbicide for chemical weed removal.

3. The system for semi-automatic and/or automatic weed removal according to claim 1, wherein the at least one weed-removal device comprises at least one mechanical weed-removal device in the form of a gripping device, separating device, pushing device, cutting device, squeezing device, and/or pressing device for mechanical weed removal.

4. The system for semi-automatic and/or automatic weed removal according to claim 1, wherein the at least one weed-removal device comprises at least one heat-generating device and/or optical device for thermal weed removal.

5. The system for semi-automatic and/or automatic weed removal according to claim 4, wherein the at least one heat-generating device and/or optical device comprises a gas burner and/or a laser.

6. The system for semi-automatic and/or automatic weed removal according to claim 1, wherein the at least one weed-removal device comprises at least one compressed air outflow nozzle for pneumatic weed removal.

7. The system for semi-automatic and/or automatic weed removal according to claim 1, wherein the at least one weed-removal device comprises at least one fluid outflow nozzle of at least one pressurized fluid for hydraulic weed removal.

8. The system for semi-automatic and/or automatic weed removal according to claim 7, wherein the at least one pressurized fluid comprises water.

9. The system for semi-automatic and/or automatic weed removal according to claim 1, wherein the at least one weed-removal device comprises at least one electric heat-generating device for electro-thermal weed removal.

10. The system for semi-automatic and/or automatic weed removal according to claim 1, wherein the at least one optical sensor is a digital camera.

11. The system for semi-automatic and/or automatic weed removal according to claim 10, wherein the digital camera is a CCD camera.

12. A vehicle, wherein the system for semi-automatic and/or automatic weed removal according to claim 1 is integrated in said vehicle.

13. The vehicle according to claim 12, wherein the vehicle is an agricultural vehicle.

14. A human-portable and human-actuable weed-removal device, wherein the system for semi-automatic and/or automatic weed removal according to claim 1 is integrated into said human-portable and human-actuable weed-removal device.

15. The system for semi-automatic and/or automatic weed removal according to claim 1, wherein the image data and the weed confirmation data additionally comprise location data.

16. The system for semi-automatic and/or automatic weed removal according to claim 15, wherein the location data comprises GPS data.

* * * * *